Patented Apr. 1, 1952

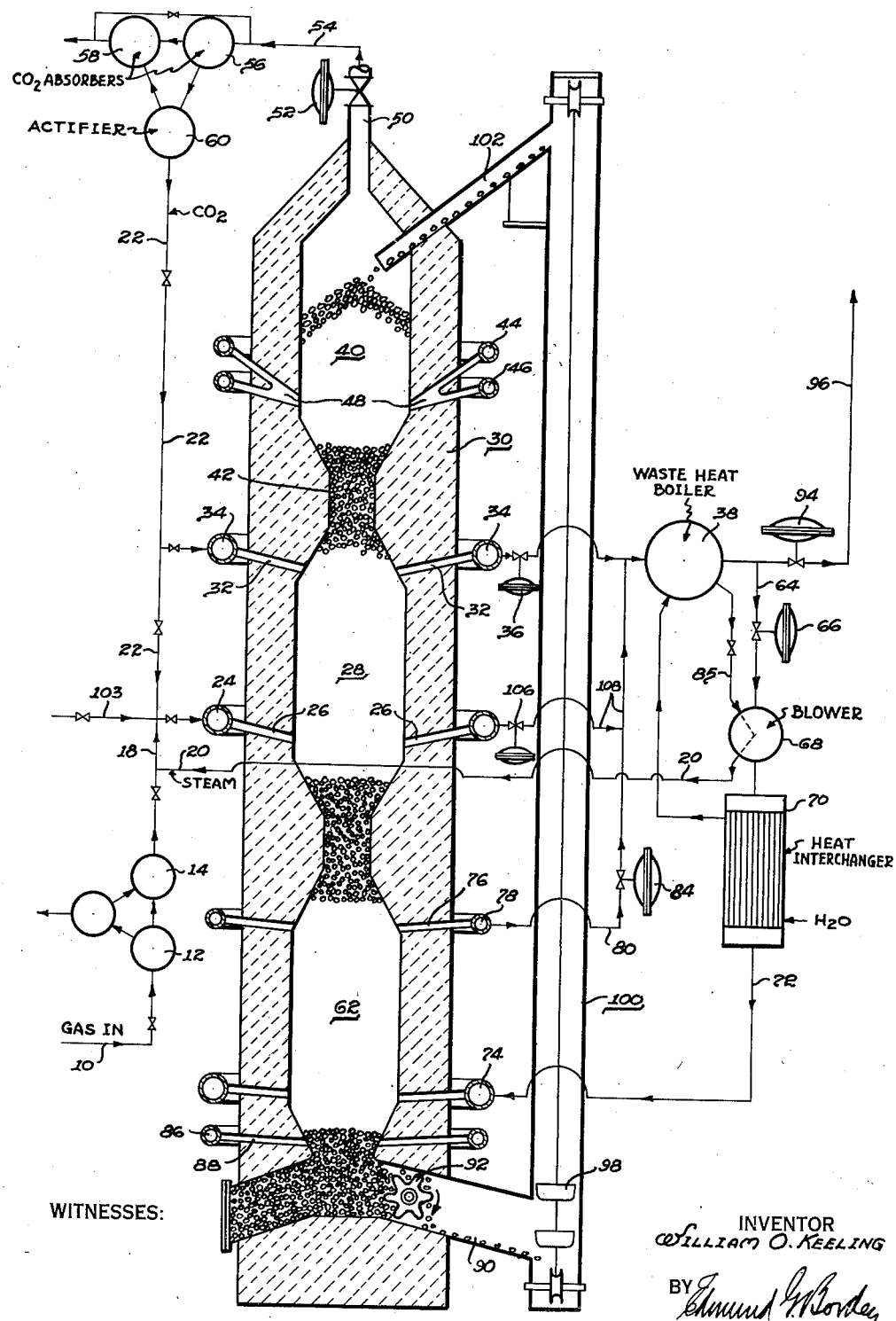

2,590,869

UNITED STATES PATENT OFFICE 2,590,869

MANUFACTURE OF GAS

William O. Keeling, Pittsburgh, Pa., assignor to Koppers Company, Inc., Pittsburgh, Pa., a corporation of Delaware Application April 21, 1945, Serial No. 589,643

2 Claims. (Cl. 48—196)

This invention relates to the manufacture of gas of a predetermined composition. More particularly the invention relates to the production of synthesis gas to be used as the charging stock for the Fischer-Tropsch synthetic production of liquid hydrocarbons.

The charging stock for the Fisher-Tropsch process is composed of hydrogen and carbon monoxide. The relative proportion of hydrogen and carbon monoxide in the charging stock has a definite influence on the final products that may be made. In accordance with the present invention the most desirable proportion of carbon monoxide to molecular hydrogen is in the ratio of 1:2.

The kind of raw material available for the manufacture of synthesis gas will modify the gas manufacturing operations and therefore it is important to use an apparatus and process that may be readily changed to utilize the different kinds of available raw material.

Raw materials commonly available for the manufacture of synthesis gases are coal and natural gas. In the use of coal for making synthesis gas the following chemical reactions appear to play an important part. These reactions occur in both primary and secondary reactions $$3C+3H_2O=3CO+3H_2$$
$$CO+H_2O=CO_2+H_2$$
$$C+O_2=CO_2$$
$$C+CO_2=2CO$$

By a proper distribution of the air or oxygen, steam, carbon dioxide and the temperature of the fuel bed a synthesis gas having a $CO:H_2$ ratio of 1:2 may be made. The natural gas which is available for making synthesis gas is composed principally of $CH_4$. By proper temperature of reaction and distribution of steam and carbon dioxide a synthesis gas having a CO to $H_2$ ratio of 1:2 may be made in accordance with the formula $$3CH_4+2H_2O+CO_2=8H_2+4CO$$

The reactions by which the $H_2$ and CO are formed are all endothermic reactions for which heat must be supplied. It is important that synthesis gas reactions should be carried out at the highest thermal efficiency to reduce the cost of producing synthesis gas.

The primary object of the present invention is to provide a process and apparatus for making synthesis gas by which the composition of the gas may be accurately controlled.

Another object of the invention is to provide a process and apparatus for making synthesis gas while maintaining a high thermal efficiency in the process.

One feature of the present invention is the use of a traveling body of refractory granules for carrying out the endothermic gas making reactions. This refractory granular material may have a catalytic composition in order to promote the gas making reactions at a lower temperature. The synthesis gas as made leaves the reaction zone at a comparatively high temperature and the heat in the gases may be utilized in generating the steam required in the gas making process. The moving refractory granules leave the gas making zone at a comparatively high temperature and this heat may be recovered in generating steam and in superheating steam and carbon dioxide to be used in the gas making process.

Accordingly another object of the invention is to utilize a continuously moving body of refractory granules for controlling the temperature in the gas making process.

A further object of the invention is to utilize a continuously moving heated body of refractory granules for controlling the gas conversion and recovering the unused heat in the refractory body for preheating products used in the gas making process.

With these and other objects and features in view, the invention consists in the gas making process and apparatus hereinafter described and particularly defined in the claims.

The apparatus illustrated in the drawings is adapted for a Fischer-Tropsch synthesis gas when using either a coal gas or a natural gas as a raw charging stock. The apparatus will first be described to illustrate the process by which natural gas may be converted to synthesis gas.

Natural gas is introduced through a line 10 and passed in series through absorbers 12 and 14. The absorbers preferably utilize a suitable alkaline solution such as sodium hydroxide for the purpose of absorbing all sulphur constituents in the natural gas, because the sulphur in the gas is poisonous to the catalyst used in the Fischer-Tropsch synthesis. The sulphur-free gas leaving absorber 14 passes through a line 18, in which it is mixed with steam introduced through a line 20. Carbon dioxide which is produced in the operation as hereinafter described is introduced into the line 18 through a line 22. The mixture of natural gas, steam and carbon dioxide then flows into a bustle pipe 24 and through tuyères 26 into the base of a conversion zone 28 which constitutes the mid-section of a refractory lined furnace 30.

The gas making constituents pass up through a bed of refractory granules which continuously move in a stream through the conversion zone, these refractory granules being heated to a sufficiently high temperature for carrying out the conversion of the gas making constituents while the gas is passing through the zone 28. The converted gas thus manufactured passes out through pipes 32 into a bustle pipe 34 and then flows through a control valve 36 through a waste heat boiler 38 wherein the heat of the gas is absorbed in generating steam.

The furnace 30 is a tall vertical structure made up of three sections or zones. The upper zone 40 is a heating zone wherein gas is burned to heat a bed of refractory granules that is continuously passing through the zone. The granules heated in the zone 40 pass downwardly through a throat 42 into the conversion zone 28. The heating of the granules in the zone 40 is carried out by means of gas which is introduced through a bustle pipe 44 and is mixed with air introduced through a bustle pipe 46. The mixture of air and gas burns within a tunnel 48 to produce a high temperature body of gas which then passes outwardly through the bed of refractory granules in zone 40, and exhausts through an outlet pipe 50. The pressure of the combustion gases within the zone 40 is controlled by a regulating valve 52 which maintains a balanced pressure within the zone 40 so that the combustion gases do not pass downwardly through the throat 42 to mix with the gas being manufactured in the zone 28. The products of combustion flowing through the valve 52 pass through a line 54 and flow through absorbers 56 and 58 in series. The absorbers are preferably continuously supplied with a sodium carbonate or other alkaline absorbing solution for the purpose of absorbing carbon dioxide. The scrubbed combustion gases passing through absorber 58 are exhausted to the atmosphere or through some outlet stack. The absorption solution from the absorbers 56 and 58 flows to an actifier 60 where the carbon dioxide is released from the absorption solution and the revivified absorption solution is then returned to the absorbers. The carbon dioxide released in the actifier 60 flows through the line 22 to the line 18 for mixture with the gas making constituents.

When the gas making constituents are treated thermally in making the Fischer-Tropsch synthesis gases the refractory granules in the lower portion of the heating zone 40 are heated to a temperature of from 2000° to 3000° F. By the time the combustion gases pass upwardly through the zone 40 they are cooled so that they exhaust from the zone 40 at a temperature of approximately 600° to 700° F. The granules which are supplied to the upper end of the heating chamber are preferably cooled in order to reduce the temperature of the exhaust gases the maximum amount.

In the treatment of natural gas for making the synthesis gases practically all of the chemical reactions involved are endothermic reactions. The steam is decomposed in the presence of carbon to make hydrogen and carbon monoxide. Furthermore, the methane is decomposed in the presence of steam to form hydrogen and carbon monoxide. Carbon monoxide in the presence of steam and methane will form carbon monoxide and hydrogen. The relative amounts of steam, carbon dioxide and methane are therein accurately controlled so that the end products produced will consist of CO and $H_2$ in the volumetric ratio of 1:2. Furthermore the temperature must be sufficiently high in order to accomplish this result. In breaking up the methane, steam and carbon dioxide to form hydrogen and carbon monoxide it is desirable to gradually heat the mixture as it rises upwardly through the granular bed countercurrent to the flow of the granular bed. The granular bed has a temperature of 1000° to 1200° F. at the bottom and has the temperature of 2000° to 3000° Fahrenheit at the top. Therefore the gas made in the conversion zone is at a high temperature and carries away a large amount of heat from the furnace. This heat is recovered in the waste heat boiler 38 by converting water to steam and in superheating the steam.

A comparatively large amount of heat is stored in the refractory granules passing through the conversion zone. It is desirable that this heat should be recovered in order to obtain a high thermal efficiency. To accomplish this the refractory which enters the top of a cooling zone 62 which forms the bottom section of the furnace 30 is a continuously moving stream which has a temperature of 1000° to 1200° F. as it enters and is cooled to a temperature of 300° to 500° F. by the time it has passed through the cooling zone. To accomplish this cooling, a portion of the synthesis gas which has passed through the waste heat boiler 38 is withdrawn through a line 64 and control valve 66 by means of a blower 68. The blower forces the gas through a heat interchanger 70 by which the gas is cooled to a temperature sufficiently low, from 150° to 300° F., to cool the refractory granules. The cooled gas leaves the heat interchanger through a line 72 and enters a bustle pipe 74 at the base of the cooling zone 62. The cooling gases pass up through the outlet pipe 76 which connects with a bustle pipe 78. The gas flowing through the bustle pipe passes through a line 80 to a pressure control valve 84 and then returns through the waste heat boiler 38. To supplement the cooling gas to reduce the temperature of the refractory granules sufficiently low, saturated steam from the boiler 38 may be introduced into bustle pipe 86 through tuyères 88 into the base of the cooling zone 62. Steam from the boiler 38 may be conducted through a line 85 to a turbine for operating blower 68 and the turbine exhaust steam may go into line 20 for gas making.

The refractory granules which pass in a continuous stream downward through the furnace act as a heat transfer medium for controlling the gas making operation. As the cold granules reach the base of the cooling zone 62, they pass into a conveyor tube 90 through a star-wheel 92 which acts to seal the bottom part of the cooling zone 62. The control valve 84 controls the pressure in the cooling zone so that the cooling gases do not tend to pass upwardly from the zone 62 into the conversion zone 28. The pressure of the gases in the conversion zone 28 is controlled by the valve 36 to confine the gases within the zone 28.

The synthesis gases which have passed through the waste heat boiler 38 and which are in excess of the amount of gas required for carrying on the cooling action in the zone 62, pass through a valve 94 to a line 96 from which they may be conducted, for example, directly to a Fischer-Tropsch synthesis unit.

The refractory granules which may be alumina, or fireclay, or mullite, or any suitable refractory, are preferably granules less than one inch in diameter and more than one-eighth of an inch in diameter. The cooled granules flow from the tube 90 into cups 98 of a conveyor 100 by which they are lifted to the top of the conveyor and emptied into a spout 102 at the top of the conveyor. The spout passes through the wall of the furnace 30 into the upper portion of the heating chamber 40 to return the refractory granules to the bed of material in the zone 40. The movement of the granules is in a continuous stream in a closed cycle through the furnace and conveyor. The rate of movement of the granules through the furnace is controlled by the rate of rotation of the star-wheel 92 and the speed of the elevator 100.

In order to supply the necessary heat which is required to secure the completion of the endothermic gas making reactions seventy-five percent of the heat required must be supplied at the highest temperature level. Accordingly this heat requirement demands that a large volume of heat carrying granules must be passed through the conversion zone in order to supply the high temperature level heat. The granules leaving the heating zone and passing into the upper part of the conversion zone are at the highest temperature level. The thermal capacity of the heating granules is very much higher than the thermal capacity of the gases being converted so that the gasses passing through the conversion zone do not absorb all of the heat in the refractory granules. Therefore the granules leaving the conversion zone are still heated to a comparatively high temperature and carry away from the conversion zone a large amout of heat. The use of the cooling zone 62 is very important, therefore, to recover the heat carried out of the conversion zone by refractory granules. When the heating granules are cooled in the cooling zone by the cooling gases circulated therethrough and the heat stored in the gases is then transferred to the waste heat boiler and heat interchangers, the thermal efficiency of the overall process is increased. It can be seen, furthermore, that if the hot granules leaving the conversion zone were returned to the top of the heating zone, then the gases of combustion in the heating zone would pass out of the heating zone at a very high temperature and thus a large amount of heat would be lost.

If a coal gas is used as the raw make gas this gas will be introduced through a line 103 which connects with the line 18. A gas made from coal, such as that produced in retorts, and a coke oven gas, which contain hydrocarbons such as methane and ethane, would be circulated through the gas conversion zone 28 in the same manner that natural gas is circulated through the conversion zone. With these coal gases would be introduced steam and carbon dioxide, in the same manner as described with reference to natural gas. The amount of steam and carbon dioxide may vary quite widely in accordance with the composition of the coal gas, but the steam and carbon dioxide would be introduced in the proper proportions for making carbon monoxide and hydrogen in the ratio of 1:2 if a synthesis gas is to be produced.

Some gases made from coal, such as producer gases, that may contain a large amount of tar or tar vapors, would preferably be circulated through the gas conversion zone so as to move through the zone concurrently with the movement of the refractory granules. These tar vapors and heavier hydrocarbons decompose at lower temperatures and tend to deposit carbon on the granules. If the gas containing these hydrocarbons, however, is introduced into the upper portion of the conversion zone in contact with the high temperature granules, such hydrocarbons while in contact with steam and carbon dioxide will be completely decomposed to form carbon monoxide and hydrogen which is suitable for a synthesis gas. Therefore a gas containing the heavy hydrocarbons would be introduced into the conversion zone through the bustle pipe 34 and tubes 32, then passed downwardly through the conversion zone 28 and exhaust through the pipes 26 and bustle pipe 24, and flow from the bustle pipe through a pressure control valve 106 and line 108 to pass through the waste heat boiler 38.

If the furnace 30 is to be used for the production of hydrogen, then a gas, such as water gas, would be introduced through the line 10 and would enter the top of the conversion zone 28 through the bustle pipe 34 and tubes 32. The water gas is made up of hydrogen and carbon monoxide and steam from line 20 would be introduced into this mixture for the purpose of converting the carbon monoxide into carbon dioxide and for producing additional hydrogen. The steam entering the high temperature granules at the top of the conversion zone would be decomposed to form oxygen and hydrogen, the oxygen combining with the carbon monoxide to form carbon dioxide and releasing hydrogen into the gas being made. If carbon dioxide is not needed in the gas making operation the exhaust gas from the top of the heating zone would pass from the line 54 through a by-pass line around the carbon dioxide absorbers 56 and 58.

The preferred form of the invention having been thus described, what is claimed as new is:

1. In a process for manufacturing a gaseous mixture of carbon monoxide and hydrogen in which a stream of refractory granules passes in succession downwardly through a heating zone wherein the temperature of the granules is raised to conversion temperature by passing hot products of combustion of carbonaceous fuel through said granules, a conversion zone wherein the heat of the granules is utilized to supply endothermic heat for converting gas making constituents comprising hydrocarbon containing gas and steam into said gaseous mixture by contacting said gas making constituents with said granules, a cooling zone and back to the heating zone in a closed cycle, the steps which comprise removing said gaseous mixture from the conversion zone, cooling at least a portion of said gaseous mixture by indirect heat exchange, and cooling the granules passing through the cooling zone so that they discharge at a temperature below 500° F. by passing the gaseous mixture cooled by indirect heat exchange countercurrently therethrough.

2. In a process for manufacturing a gaseous mixture of carbon monoxide and hydrogen in which a stream of refractory granules passes in succession downwardly through a heating zone wherein the temperature of the granules is raised to conversion temperature by passing hot products of combustion of carbonaceous fuel through said granules, a conversion zone wherein the heat of the granules is utilized to supply endothermic heat for converting gas making constituents comprising hydrocarbon containing gas and steam into said gaseous mixture by contacting said gas making constituents with said granules, a cooling zone and back to the heating zone in a closed cycle, the steps which comprise removing said gaseous mixture from the conversion zone, producing superheated steam by indirect heat exchange with at least a portion of said gaseous mixture, cooling the granules passing through the cooling zone by passing the gaseous mixture cooled by indirect heat exchange countercurrently therethrough, and introducing said superheated steam to the conversion zone.

WILLIAM O. KEELING.

REFERENCES CITED

The following references are of record in the file of this patent:

UNITED STATES PATENTS

| Number | Name | Date |
|---|---|---|
| 1,841,201 | Odell | Jan. 12, 1932 |
| 1,903,845 | Wilcox | Apr. 18, 1933 |
| 1,904,592 | Young et al. | Apr. 18, 1933 |
| 1,977,684 | Lucke | Oct. 23, 1934 |
| 2,349,439 | Koppers | May 23, 1944 |
| 2,355,753 | Roberts, Jr. | Aug. 15, 1944 |
| 2,383,715 | DeJohn | Aug. 28, 1945 |
| 2,387,378 | Wolk | Oct. 23, 1945 |
| 2,399,450 | Ramseyer | Apr. 30, 1946 |
| 2,400,475 | Jacomini | Apr. 27, 1948 |
| 2,448,290 | Atwell | Aug. 31, 1948 |